United States Patent [19]
Smith

[11] Patent Number: 5,796,716
[45] Date of Patent: Aug. 18, 1998

[54] METHOD AND APPARATUS FOR SIMULTANEOUS VOICE/DATA TRANSMISSION

[75] Inventor: Richard Kent Smith, Seminole, Fla.

[73] Assignee: Paradyne Corporation, Largo, Fla.

[21] Appl. No.: 562,954

[22] Filed: Nov. 27, 1995

[51] Int. Cl.$^6$ ............................................. H04J 11/00
[52] U.S. Cl. .................... 370/207; 370/527; 375/262; 375/222
[58] Field of Search .................... 370/276, 206, 370/207, 286, 208, 209, 493–495, 468, 522, 527, 528, 503; 375/229–231, 261, 222, 262, 265, 340, 341; 371/43, 37.1, 37.8

[56] References Cited

U.S. PATENT DOCUMENTS

| | | | |
|---|---|---|---|
| 4,709,377 | 11/1987 | Martinez et al. | 375/262 |
| 5,448,555 | 9/1995 | Bremer et al. | 375/222 |
| 5,475,713 | 12/1995 | Bremer et al. | 375/261 |
| 5,521,942 | 5/1996 | Betts et al. | 375/261 |
| 5,559,791 | 9/1996 | Bremer et al. | 370/493 |
| 5,559,792 | 9/1996 | Bottoms et al. | 375/222 |

Primary Examiner—Chau Nguyen
Attorney, Agent, or Firm—Thomas, Kayden, Horstemeyer & Risley LLP

[57] ABSTRACT

A method and simultaneous voice/data transmission of signals through a single communications channel wherein the transmitted voice and data signal quality is greatly enhanced over current practice. A time-varying stream of coded voice and data signals is simultaneously transmitted and the sequence of transmitted data signals is determined only after receiving data signals for a predetermined period of time. The received signals are buffered and a received coded data signal sequence is compared to a predetermined plurality of permissible coded data signal sequences to correlate the received coded data signal sequence with the particular permissible coded signal sequence with which the data signal was coded prior to transmission. The correlated data signal sequence is then separated from the combined voice and data signal to recover the coded voice signal. The recovered voice signal and correlated data signal sequence are thereafter decoded to recover the voice and data signals that were received and coded by the transmitter. Timing and equalization of the receiver are also maintained during intervals in which no data signals are transmitted, i.e. "voice only" mode, by generating in such intervals a data tracking signal for combination with the coded voice signal and transmission of the resulting combined signal to the receiver.

20 Claims, 5 Drawing Sheets

METHOD AND APPARATUS FOR SIMULTANEOUS VOICE/DATA TRANSMISSION

BACKGROUND OF THE INVENTION

1. Field of the Invention

The present invention is directed to a method and apparatus for simultaneously transmitting voice and data signals and, more particularly, for improving the quality of both the voice and data transmissions during a simultaneous voice/data communication and for eliminating the delay normally associated with re-establishing modem timing and equalization after a period in which no data is transmitted in a simultaneous voice/data communication.

2. Description of the Prior Art

Prior art simultaneous voice/data transmission systems are operable for transmitting both voice signals and data signals at the same time over a single communications line, as for example an analog telephone channel. One such known system encodes the analog speech signal using speech compression and converts the compressed analog speech signal to a digital bit stream. The bit stream is then multiplexed with a data signal and transmitted over a communications line using a standard modem.

Another known method of simultaneous voice/data transmission is referred to as Framed Quadrature Audio/Data Modulation (Framed QADM). This method transfers digital data over, for example, a 14.4 kbps (14,400 bits per second) link at a data rate of 6 kbps, of which 1,200 bps is allocated to side information and the balance of 4,800 bps to the user for the data. The remaining channel capacity is allocated to processed audio signals which are attached to the data portion for transmission. In some simultaneous voice/data implementations, the data rate is immediately increased to 14.4 kbps whenever there are pauses in the voice transmission; since a large portion of a normal voice transmission is typically silent, the average data rate throughout is typically on the order of 10,000 bps. Processing of the voice signal generates the above-mentioned side information, in digital form, which contains information relating to the manner in which the signal is encoded to assist in decoding the voice signal. The processing of the voice signal in this manner notably enhances its immunity to channel noise and impairments.

In the QADM prior art method of simultaneous voice/data transmission the data signals are processed and coded to form what can be graphically represented as a constellation of discrete points in the complex plane. This may be a two point, a four point or in general a multipoint constellation, each discrete point represented by a point in the complex plane. The voice signal processing forms a voice signal point which defines the magnitude and angle or direction of a "voice signal vector". When the time-varying voice and data signals are accumulated over a period of time and represented graphically, there is no longer a single discrete point but, rather, a continuum of points (referred to as a "cloud") representing the collection of voice signal points positioned about each discrete data point. The aforementioned voice signal vector for each voice signal is formed by connecting its respective point in the cloud with the discrete data point about which it is positioned. The prior art processing of the voice and data signals will now be described in further detail with specific reference to FIG. 1.

Figure 1:
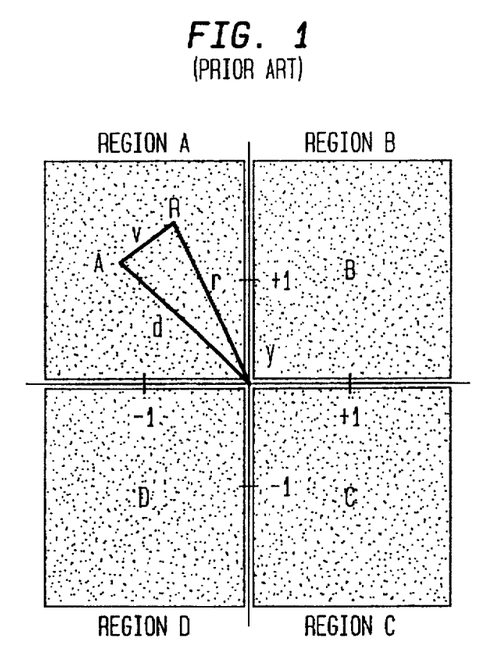
FIG. 1 is a graphical representation of a prior art four-quadrant amplitude modulation voice/data signal.

An illustrative prior art, 4-quadrant Quadrature Amplitude Modulated data symbol constellation, shown in FIG. 1, for use in a simultaneous voice/data system is disclosed in co-pending U.S. patent application Ser. No. 08/076,505, filed Jun. 14, 1993, now U.S. Pat. No. 5,448,555, of Gordon Bremer et al. In this transmission, a data signal is first encoded in each signaling interval τ for association with one of the four regions "A", "B", "C", and "D". Region "A" is that region associated with the signal point defined by the signal space coordinate pair (−1, +1) and represents the "in-phase" and "quadrature" components. In a prior art data-only communications system, a transmitter transmits only one of the four symbols selected from this symbol constellation; there are but four valid signal point coordinates that may be transmitted. In a voice/data system, however, an analog signal (e.g. a voice signal) is added to the transmitted data symbol, so that any signal point within a chosen region may be transmitted. Each valid region is also associated with a different data symbol. For example, in each signaling interval τ, the voice signal is processed in such a way as to provide two samples of the voice signal. These two samples are used to create a "voice signal vector" in the constellation signal space, as for example the voice signal vector v in FIG. 1. Thus, for every signaling interval, the two samples of the voice signal are attached to a signal point about the origin of the signal point constellation; the coordinates of this signal point define the magnitude and angle of the voice signal vector v from the origin of the signal point constellation. This voice signal vector is then added, as by vector addition, to a data vector d which represents the data signal in each signaling interval τ. The resultant vector r extends from the origin to a particular signal point R for transmission from the selected region.

A variety of problems exist with these prior art methods of simultaneous voice/data transmission. For many applications of this technology, a higher voice quality than that of which these methods are capable is either necessary or desired. Using the currently known methods, moreover, a determination as to the coding of the data is made for each signal interval or data signal as it is received; each determination is based upon the quadrant into which the voice signal vector extends. If—for each individual signal interval—the amplitude of the voice signal is high enough to cause the vector representation of the transmitted signal to extend into a different quadrant than that from which it originated, an error in determining the value of the coded data signal will occur. In prior art systems, therefore, the voice signal must be transmitted at a limited amplitude to avoid the possibility of errors in decoding.

Prior art applications are also unable to instantaneously switch to either a voice/data or a data-only transmission from a state in which only voice signals are being transmitted. When only voice signals are transmitted, no timing and equalization settings are needed for proper operation of the receiving modem. Such settings are, on the other hand, required for data transmission and receipt. The timing and equalization settings are maintained throughout the receipt of the digital data signals. Currently, practical methods accordingly encounter a delay—associated with retraining of the modem due to loss of the timing and equalization settings—when it is desired to once again transmit digital data signals after an interval in which only voice signals have been communicated.

It would therefore be desirable to provide a simultaneous voice/data system capable of improving voice quality at the sacrifice of data rate (but while maintaining a sufficient effective data rate for operation of the desired application). It would also be desirable to provide such a system in which the deleterious effects of increased voice signal amplitude on data detection are eliminated. It would be further desirable to provide a system in which voice-only transmission is possible and which, upon switching to either a simultaneous voice/data transmission or a data-only transmission, would not introduce a delay caused by retraining or readaptation of the modem to accommodate transmission and receipt of the digital data signals.

SUMMARY OF THE INVENTION

The present invention provides improved quality of both the voice signal and data signal of a simultaneous voice/data transmission at a sacrifice of data rate, i.e. the invention makes use of known channel coding techniques to combat the deleterious effects of increased voice signal amplitude on data detection, while maintaining an acceptable error rate and data rate required for operation of a desired application. The present invention also provides for retention of the timing and equalization settings of the modem during periods in which no data signals are being transmitted.

To accommodate transmission of the voice signals, i.e. to transmit the voice signals at a higher amplitude and thereby improve their quality, the data signals are coded in the transmitter according to one of a predetermined number of permissible or available coded data sequences. The coding scheme used in a particular transmission is determined or selected by the transmitting and receiving modems during the initial handshaking in which the transmission path is established. The encoded data of this sequence is then combined with a coded voice signal and transmitted. The transmitted combination signal is received by the receiver and buffered, i.e. demodulated and stored, over a predetermined number of signal intervals representing a portion of the coded data sequence sufficient to determine the transmitted data signal sequence; the predetermined number of signal intervals is either preset by design or based upon the coding scheme used by the transmitter. After this buffering period, the stored sequence is compared with each of the various permissible transmitted coded data signal sequences determined or selected during the handshake and based upon the coding scheme. A likelihood metric is determined for each such comparison, rating the various permissible sequences according to how closely each permissible sequence matches the received and stored sequence. The permissible sequence with the most favorable likelihood metric is determined to be the transmitted data signal sequence. A data determination as to the possible sequence may also be made prior to the comparison and then, as an additional measure of improving the quality of the data transmission, the determined sequence is compared to the various permissible transmitted coded data signal sequences as described above. A data determination can also be made for each of the transmitted coded data signals upon receipt whereby the determined coded data signals are buffered to form a received coded data signal sequence prior to comparison with the various permissible transmitted coded data signal sequences. By buffering over a large number of signals and comparing the received coded data signal sequence with the various permissible transmitted coded data signal sequences, the possibility of obtaining an error in determining the actual coded data signals is greatly reduced, if not eliminated. This is because a signal that would produce an error determination will be factored out when the received sequence is compared with the predetermined permissible sequences, i.e. the entire sequence received is compared with the permissible sequences and the sequence most closely matching the received sequence is determined to be the transmitted sequence.

During periods when no data needs to be sent, the present invention also operatively generates a tracking signal of an unusable data rate and combines it with the voice signal for transmission. The tracking signal is generated during each such "voice-only" mode, i.e. when no user data is being transmitted, and may be used to maintain both the timing and equalization settings of the modem and thereby maintain modem synchronization. There is accordingly no delay for retraining the modem when user data is once again desired to be transmitted after a voice-only interval or period as the modem will continue to operate as though user data is actually being transmitted continuously.

Other objects and features of the present invention will become apparent from the following detailed description considered in conjunction with the accompanying drawings. It is to be understood, however, that the drawings were designed solely for purposes of illustration and not as a definition of the limits of the invention, for which reference should be made to the accompanying claims.

BRIEF DESCRIPTION OF THE DRAWINGS

In the drawings, wherein like reference characters denote similar elements throughout the several views.

DETAILED DESCRIPTION OF THE PREFERRED EMBODIMENT

Figure 4:
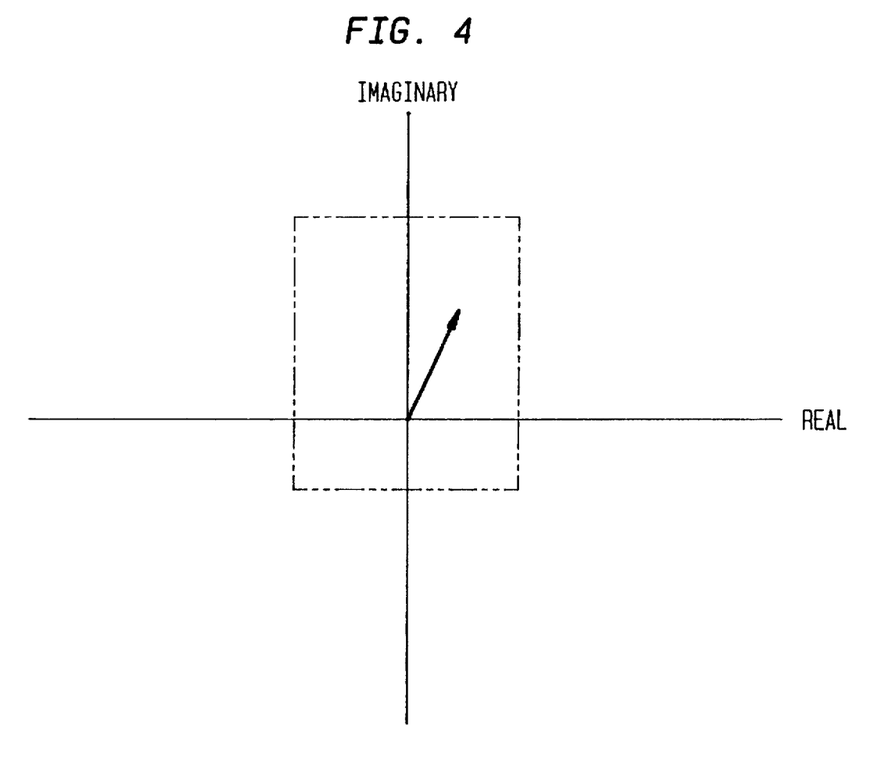
FIG. 4 is a graphical representation of a coded voice signal.
Figure 7:
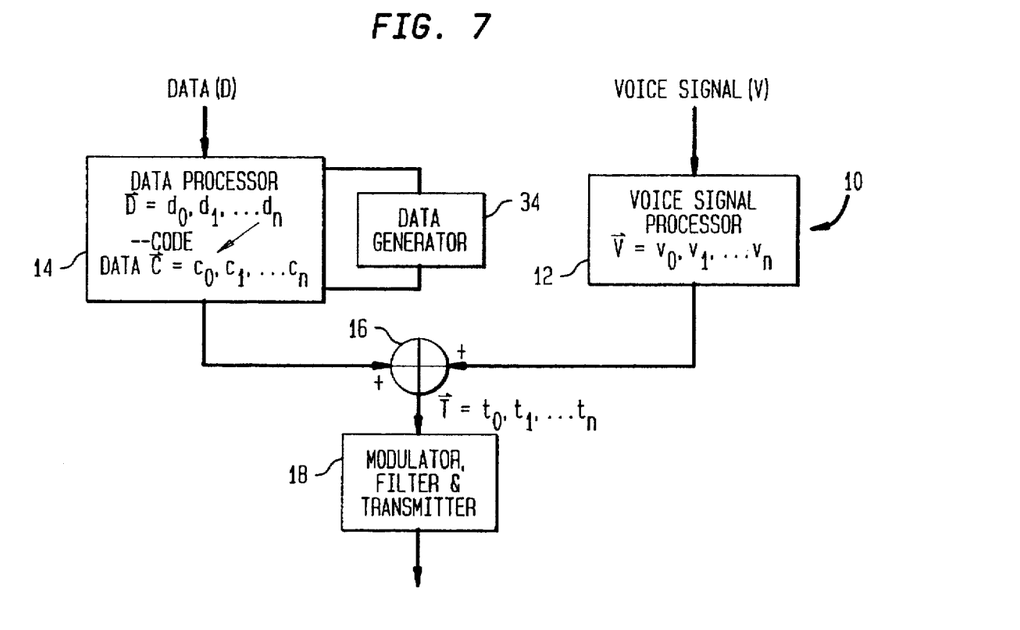
FIG. 7 is a block diagram of a transmitter used in or in association with a modem in accordance with the present invention.

A simplified but preferred embodiment of a transmission system or transmitter 10 for use and in accordance with the present application is shown in FIG. 7. The voice signal V that is input to the transmitter 10 is processed into a two-dimensional signal (FIG. 4) sampled at the modem signal rate in a voice signal processor 12. FIG. 4 is a graphical representation of a single coded voice signal for transmission with a coded data signal in accordance with the present invention. This voice signal has been processed to create the discrete-time, continuous-amplitude, two-dimensional signal depicted in FIG. 4 as a two-dimensional vector. The range of the processed voice signal is shown as a dotted-outline box identifying the limit to which the voice signal may be amplified for transmission. If the voice signal is amplified beyond that range and combined with a data signal for transmission, a data signal error is likely to occur using conventional prior art methods for decoding the data signal at the receiver. The two-dimensional voice signal defines the magnitude and angle of the voice signal vector. The voice signal is modulated using, for example, prior art voice signal processing techniques well known by those skilled in the art and, accordingly, no further discussion of the voice signal processing is deemed necessary.

Figure 2:
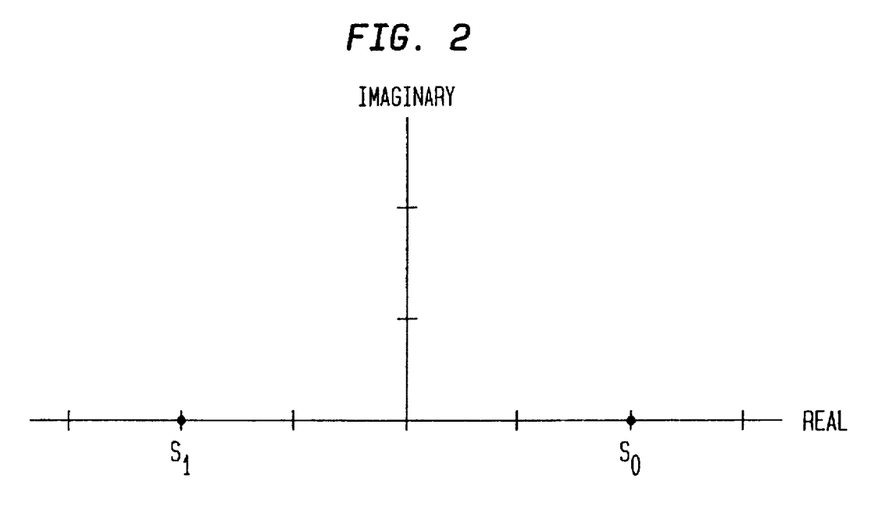
FIG. 2 is a graphical representation of coded data signals in a two-quadrant system.

The data signals D are input to a data processor 14 of the transmitter 10 where they are encoded using conventional techniques. FIG. 2 is a graphical representation of exemplary coded data components in the complex plane as transmitted in accordance with the present invention. These data components are represented by a signal constellation consisting of two discrete points $S_0$ and $S_1$, each located along the real axis of a signal space. An illustrative signalling set for a two symbol signal constellation using a binary signalling alphabet is shown in Figs.3a–3h. In such a coding scheme, a code sequence is assigned to every three-bit data sequence as the data continuously enters a coder. Thus, there are eight code sequences, each comprised of eight signalling intervals having a data signal of $S_0$ or $S_1$ in each interval, in the signalling set needed to define all possible three-bit combinations in the binary signalling alphabet. As the incoming data passes into and through the coder, each three-bit sequence is coded as a respective code sequence of the signalling set. For example, a three-bit sequence of "000" will be coded to define the code sequence shown in FIG. 3a, i.e. an $S_0$ in eight consecutive signalling intervals; a three-bit sequence of "001" will be coded to define the signalling set shown in FIG. 3b, i.e. an $S_1$ in eight consecutive signalling intervals; a three-bit sequence of "010" will be coded to define the signalling set shown in FIG. 3c, i.e. an $S_0$ in four consecutive signalling intervals followed by an $S_1$ in the next four consecutive signalling intervals; and so on.

It should be understood that the present invention is not intended to be limited to use of the particular coding sets or schemes herein described but, rather, is applicable for use with any suitable coding set or scheme used for channel coding as a general matter of design choice. The data processor 14 is operable to encode the data over multiple signals, thereby producing a coded data signal sequence C. Attached to the data processor 14 is a data generator 34 for producing a tracking data signal when no user data D is being input to the data processor 14. The operation of the data generator 34 will be described hereinafter.

Figure 5:
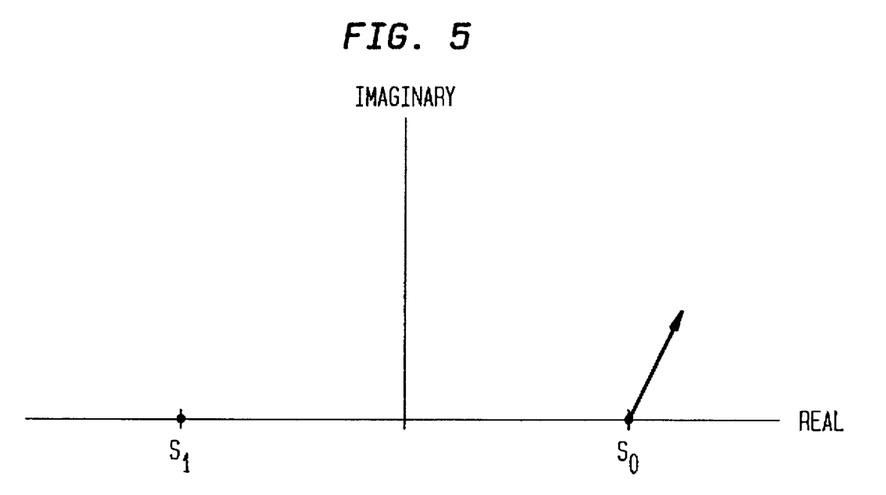
FIG. 5 is a graphical representation of a voice/data signal.
Figure 6:
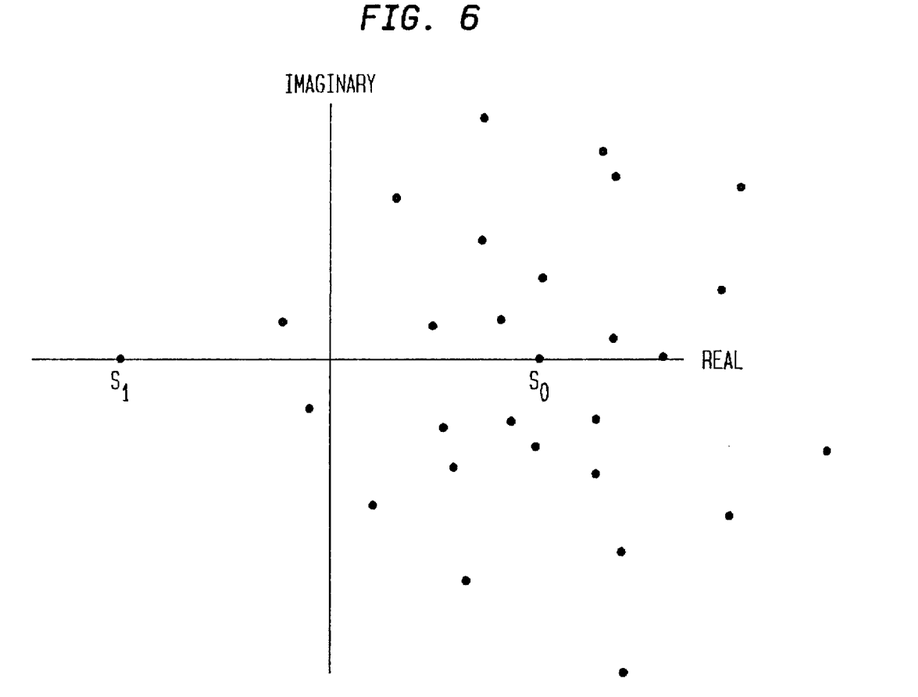
FIG. 6 is a graphical representation of a data point and a cloud of voice signals thereabout in a two-quadrant system.

Each data signal in the coded data signal sequence is then combined with a processed voice signal in an adder 16. The combined voice and data signal T is modulated and filtered prior to transmission. In its most basic form, this constellation is created by adding a voice signal to each data signal $S_0$ or $S_1$ in each interval. Thus, for each three-bit sequence a series of eight data signals of $S_0$ and $S_1$, each in a respective one of the eight signal intervals, will be attached to a coded or processed voice signal. The combination of the coded voice and data signals may be graphically represented as a two-dimensional vector, extending from the position of the discrete data signal $S_0$ into its respective quadrant at the angle of and for a distance equal to the magnitude of the voice signal vector, as shown in FIG. 5. FIG. 6 depicts a sequence of voice and data signals sampled over a period of time about the point $S_0$. These samples produce the "cloud" of voice signals about the data signal point $S_0$. The two-dimensional voice signal vector representation of the voice signals combined with the data signal, as shown in FIG. 5, results from connecting the voice signal points about their respective data signal point to form a vector. As can be seen, certain voice signals are present outside of the quadrant occupied by $S_0$, i.e. to the left of the imaginary axis. The magnitude and angle of the voice signal vector, when attached to the data signal $S_0$, causes the voice vector to cross into a different quadrant from that in which it originates.

The data signal points $S_0$ and $S_1$ and the voice signals attached thereto are then transmitted in accordance with the coded sequence by a modulator, filter and transmitter 18 as known in the art and in accordance with conventional or otherwise appropriate transmission methods or techniques to a receiving modem. In prior art methods, as each signal point is received at the receiving modem it is decoded to determine whether an $S_0$ or an $S_1$ was sent, thereby enabling the separation of the data and voice signals. If the amplitude of the voice signal was high enough to cause the voice signal vector to extend into another quadrant, i.e. to the side of the imaginary axis opposite the data signal point to which it is attached, an error in determining the coding of the data signal will occur. For example, the two voice signals which appear to the left of the imaginary axis in FIG. 6 will, in accordance with the prior art, be determined to be attached to an $S_1$ data signal when, in fact, they are actually attached to an $S_0$ data signal. Thus, in prior art arrangements the amplitude of the voice signal must be limited in order to prevent the voice signal vector from extending into another quadrant and to thereby avoid errors in determining the coding of the data signal point at the downstream receiver.

Figure 8:
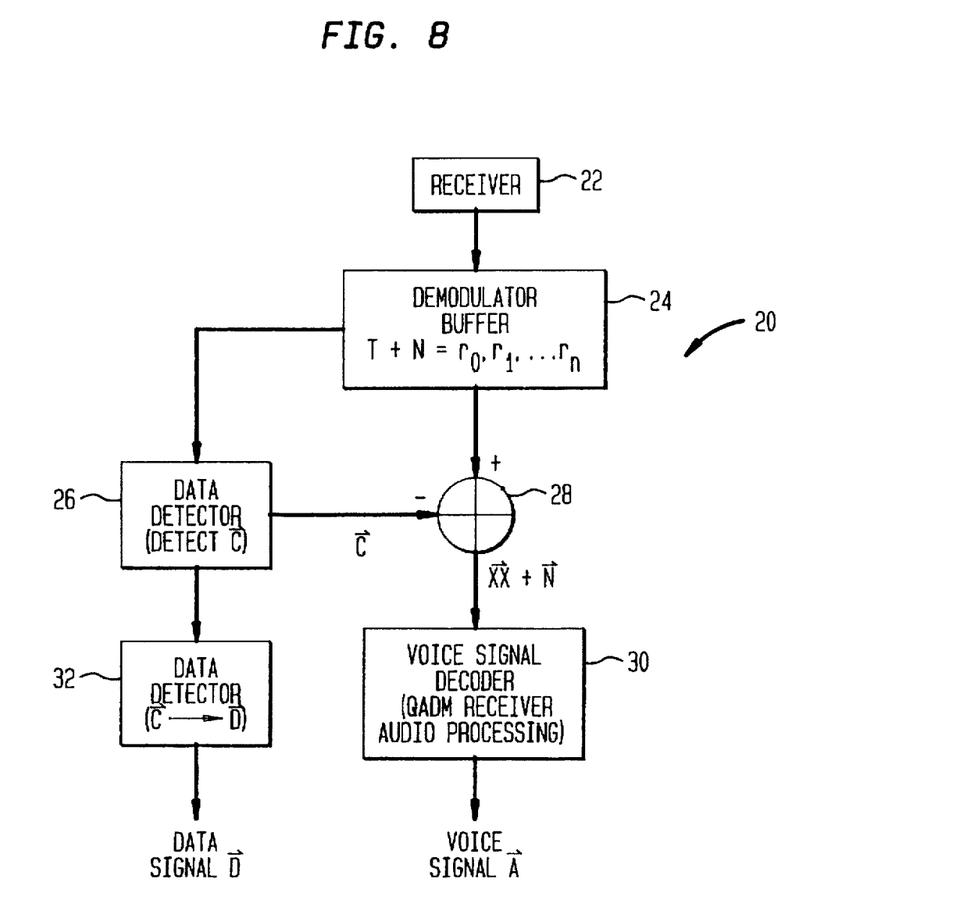
FIG. 8 is a block diagram of a receiver used in or in association with a modem in accordance with the present invention.

A receiver modem 20, constructed in accordance with the present invention and shown by way of example in FIG. 8, receives the transmitted simultaneous voice/data signals in a receiver circuit 22 and directs the received signals to a buffer 24 that demodulates and collects or stores the voice/data signals received over a predetermined period of time. The received signals are the transmitted signals T plus any noise N picked up in the communication channel and are demodulated in accordance with the modulation performed in the transmitter modem prior to transmission as is known in the art. The period over which the buffer 24 stores the signals is either preset by design or established during the handshake sequence between the transmitting and receiving modems and is dependent upon the particular coding scheme being used. In any event, after the predetermined period of time has elapsed, the contents of the buffer 24 are directed to a data detector 26 wherein the signal sequence of the received coded data signal is compared to each of the various permissible coded data sequences—as established during the handshake process and also stored in the data detector 26—and a likelihood metric or reliability factor indicating the extent to which each permissible sequence matches the transmitted sequence is calculated or developed. The permissible coded data sequence which has the most favorable likelihood metric, indicating that it most closely matches the received sequence, is thus identified or determined to be the transmitted data signal sequence.

The determination of the transmitted sequence may alternatively be made after the buffering of the received coded data signals and prior to comparison with the various permissible coded data sequences. This determined coded data signal sequence is then compared to each of the various permissible coded data signals in the data detector 26 in the same manner as the received signals discussed above to identify the transmitted sequence. It is also possible to identify the coding of each coded data signal as it is received by the receiving modem. The identified coded data signals are then stored and, after buffering the received signals for the predetermined period, a stored sequence of signals is identified. The data detector 26 then compares the stored sequence of identified signals with each of the various predetermined permissible coded data signal sequences to identify or determine the actual transmitted coded data signal sequence in the same manner as discussed above. The comparison of the identified sequences with the predetermined permissible sequences thus adds an additional measure of surety to the identification of the actual transmitted coded data signal sequence and greatly improves the quality of the received data signal. By buffering over a large number of signals, any errors in identifying the coding of individual coded data signals may be virtually eliminated as the correct coded data signals for the buffered signal sequence will be determinable through comparison with the finite number of permissible transmitted coded data signal sequences. The sequence determined to have been transmitted will be the permissible sequence having the most favorable likelihood metric, indicating that it most closely matches the received sequence.

Figures 3, 3A:
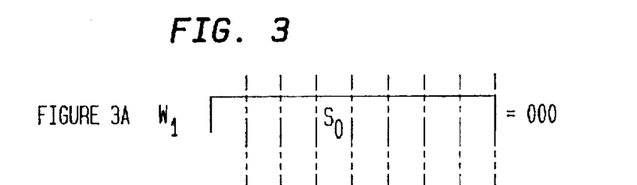
FIGS. 3a–3h depict by way of example a suitable signalling set for use in voice/data transmission in accordance with the present invention.
Figure 3B:
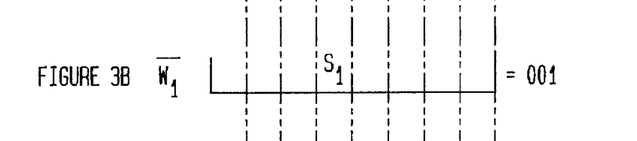
Figure 3C:
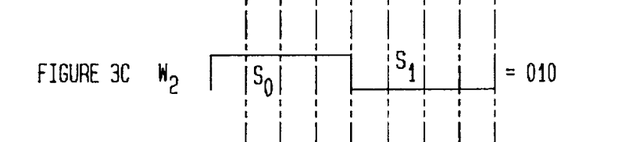
Figure 3D:
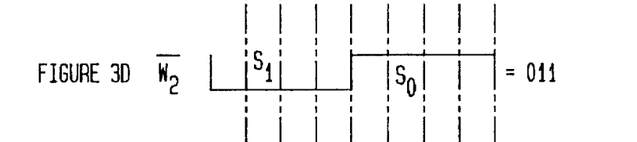
Figure 3E:
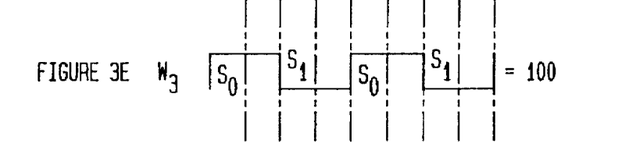
Figure 3F:
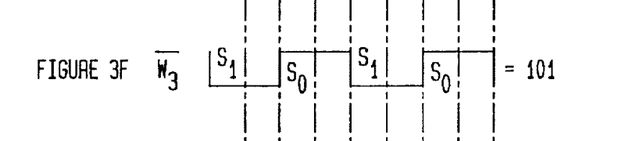
Figure 3G:
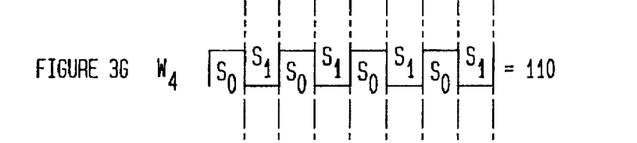
Figure 3H:
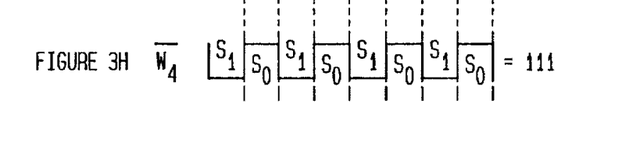

For example, using the two point system previously discussed and the signalling set of FIGS. 3a –3h, if a control sequence consisting of $S_0$, $S_0$, $S_1$, $S_0$, $S_1S_1$, $S_1$, $S_1$ is received, a likelihood metric for each permissible sequence in the signalling set will be calculated or developed and, in this instance, the sequence of FIG. 3c would be associated with a likelihood metric indicating that it most closely matches the received sequence and that it thus identifies the transmitted sequence. The likelihood metric for each individual comparison is developed at the time of comparing the received sequence with the particular permissible coded data sequence. An error which would occur in prior art methods when identifying the third received coded data signal will be factored out by the comparison and likelihood metric determination. As a consequence, the quality of the data signal is notably improved because the deleterious effects, i.e. incorrect data determinations, otherwise caused by an increase in voice signal amplitude are eliminated, and the voice signal received and decoded is also noticeably improved since it may be more accurately decoded upon separation from a correctly-identified coded data signal. Furthermore, due to the increased accuracy in identifying and decoding the received coded data signals, the allowable amplitude range of the transmitted voice signal may be increased because any extension of the voice signal vector into another quadrant has a significantly diminished effect on the ability to correctly identify or determine the actual coded data signal that was transmitted.

Once the coded data signal sequence of the combination has been determined, the individual coded voice and data signals can be separated. The identified signal sequence from the detector 26 and the voice/data signal from the buffer 24 are both directed to a subtractor 28 to extract the voice signal from the received voice/data signal. Since the identified coded data signals are subtracted from the voice/data signals in subtractor 28, it is necessary to obtain the correct coded data signal sequence before subtraction to prevent an error in determination or decoding of the coded voice signal. Thus, integration of the voice/data signal over a predetermined number of samples is carried out before the transmitted coded data sequence is identified or determined.

Once the coded voice signal has been separated out it is processed, as would normally be done, in the voice signal decoder 30. The coded data signals are decoded in the data decoder 32 in accordance with the identified coded data signal sequence. In this manner, the transmitted data and voice signals are retrieved using conventional decoding techniques after or in conjunction with separation of the coded voice and coded data signals in accordance with the invention.

The present invention thus provides the unique ability to significantly increase the amplitude of the transmitted voice signal with a resultant improvement in voice signal quality. Any errors in identifying the received data signal resulting from the increased voice signal amplitude are avoided by determining the coded data sequence through a comparison of the received signals buffered over a predetermined period of time to form a received sequence with various permissible transmitted sequences rather than individually and immediately as each signal is received. Thus, the present invention uses well known and conventionally employed channel coding techniques to reduce the effects of channel noise on data detection and eliminate the additional effects of increased voice signal amplitude on data detection or identification in a simultaneous voice/data transmission.

Although the present invention operatively transmits symbols at the same rate as conventional modems, it reduces the effective data rate in that data decoding is being delayed; this is because data determinations are carried out only after receipt of a number of signals over a predetermined period of time and not as each individual signal or sequence is received. For many applications, which do not require a high data rate, the buffering of a plurality of signals over an extended time prior to identifying a received signal sequence will not affect the normal operation of the application and, moreover, the resulting increase in voice signal amplitude and voice quality will greatly outweigh the corresponding reduction in effective data rate.

There are also some voice/data applications in which voice only is sometimes needed but where the ability to switch rapidly to a combination of simultaneous voice plus data is important. In such applications, it would be advantageous to provide a voice-only mode in which the very best voice quality is provided, together with the ability to rapidly switch to a simultaneous voice/data mode or data-only mode if and when necessary to transmit data. The problem with a voice-only mode is that when data transmission is completely suspended, the equalization and timing recovery groups of the receiving modem may be unable to continue tracking the transmitted signal, thus necessitating retraining of the receiving modem when operation is switched from a voice-only to either a simultaneous voice/data or data-only mode.

In voice-only mode, there is no requirement to make reliable data decisions, but only to maintain the timing and equalization settings of the receiving modem; as reliable data decisions are not necessary, the voice energy can be dramatically increased in this mode.

This problem of loss of the receiver's timing and equalization settings is overcome by the present invention in the same manner that the invention accommodates this functionality in the aforementioned simultaneous voice/data transmission. Accordingly, in voice-only mode a data signal is generated by a data generator 34 coupled to the data processor 14, as shown in FIG. 7. The data signal generated at data generator 34—which effectively defines a tracking signal—has a data rate which is typically unusuably low for any typical data application. The tracking signal is used to maintain the timing and equalization settings of the receiving modem and, thus, modem synchronization. By way of example, the tracking signal may take the form of a sequence of alternating binary ones and zeros or a particular pseudo-noise sequence. The coded tracking signal is combined with the voice signal that has been processed in the voice signal processor 12 and is then modulated, filtered and transmitted, as explained hereinabove, by a conventional modem. The transmitted signal is received by the receiver 20 (FIG. 7) as previously described, is buffered over a predetermined number of signal times or intervals to identify the actual coded data signal sequence, and is then subtracted from the received signal to separate out and obtain the transmitted voice signal. If the data transmission rate is decreased to a very low rate, or is discontinued, for some period of time during transmission, the transmitting modem can so signal the receiving modem and dynamically effect a change in the buffering period. The buffering period can thus be dynamically varied during transmission based upon the required data rate of the data application. By transmitting the tracking signal with a voice-only signal, the receiving modem is able to maintain its timing and equalization settings while maintaining the invention's improved voice signal quality.

Although the present invention inherently includes, in practice, a trade-off between voice performance, data rate and data performance, there are numerous applications in which a much lower effective data rate is more than adequate for the application and is more than balanced by the better attainable voice and data signal quality at the receiving end of the transmission link. Thus, the present invention is operable to greatly improve voice and data quality without reducing the data rate below a required or acceptable level.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of simultaneous voice/data transmission, comprising the steps of:

receiving at a transmitter and coding a time-varying user data signal using a selected coded signal sequence of a predetermined coding scheme defined by a plurality of permissible coded signal sequences to produce a coded data signal sequence;

receiving at the transmitter and coding a time-varying voice signal;

combining the coded data signal sequence with the coded voice signal;

transmitting the combined coded voice and coded data signals along a single communication channel to a receiver;

receiving the combined coded voice and coded data signals in the receiver;

buffering the combined coded voice and coded data signals received in the receiver over a predetermined period of time to define a buffered coded data signal sequence;

comparing the buffered coded data signal sequence with each of the plural permissible coded signal sequences to identify the selected coded signal sequence with which the user data signal was coded;

subtracting each coded data signal of the identified coded data signal sequence from the buffered combined coded voice and coded data signal from which the selected coded signal sequence was identified to recover the coded voice signal; and decoding the recovered coded voice signal and the identified coded data signal sequence to recover the voice and data signals received at the transmitter.

2. The method of claim 1, wherein said step of comparing further comprises comparing the buffered coded data signal sequence with each of the plural permissible coded signal sequences to provide a likelihood metric for each said comparison, said likelihood metric defining a degree to which the permissible coded signal sequence of each comparison matches the buffered coded data signal sequence for correlating the buffered coded data signal sequence with the permissible coded signal sequence with which the data signal was coded prior to transmission.

3. A method of simultaneous voice/data transmission, comprising the steps of:

receiving at a transmitter and coding a time-varying user data signal using a selected coded signal sequence of a predetermined coding scheme defined by a plurality of permissible coded signal sequences to produce a coded data signal sequence;

receiving at the transmitter and coding a time-varying voice signal;

combining the coded data signal sequence with the coded voice signal;

transmitting the combined coded voice and coded data signals along a single communication channel to a receiver;

receiving the combined coded voice and coded data signals in the receiver;

buffering the combined coded voice and coded data signals received in the receiver over a predetermined period of time to define a buffered coded data signal sequence;

comparing the buffered coded data signal sequence with each of the plural permissible coded signal sequences to identify the selected coded signal sequence with which the user data signal was coded;

subtracting each coded data signal of the identified coded data signal sequence from the buffered combined coded voice and coded data signal from which the selected coded signal sequence was identified to recover the coded voice signal;

decoding the recovered coded voice signal and the identified coded data signal sequence to recover the voice and data signals received at the transmitter and generating, when no data signal is being received at the transmitter for coding, a data tracking signal for combination with the coded voice signal to form said combined signal for transmission to the receiver along the communication channel.

4. The method of claim 3, wherein said generated data tracking signal comprises side data for use by the receiver to maintain timing and equalization of the receiver during time intervals in which no data signal is being received at the transmitter for coding and transmission to the receiver.

5. The method of claim 1, further comprising the step of storing the buffered coded data signal sequence prior to said comparing step.

6. The method of claim 1, further comprising the step of detecting the selected coded data signal sequence from the buffered combined coded voice and coded data signals prior to said step of comparing.

7. In a system for simultaneous voice/data transmission over a single communication channel and including a transmitter comprising data processing means for receiving and coding a time-varying user data signal using a selected coded signal sequence of a predetermined coding scheme defined by a plurality of permissible coded signal sequences to produce a coded data signal sequence, voice signal processing means for receiving and coding a time-varying voice signal, means for combining the coded data signal sequence with the coded voice signal, and means for transmitting the combined coded voice and coded data signals over the communication channel to the receiver, a receiver comprising:

means for buffering the combined coded voice and coded data signals received by the receiver from the transmitter over a predetermined period of time to define a buffered data signal sequence;

comparing means, coupled to said buffering means, for comparing the buffered coded data signal sequence with each of the plural permissible coded signal sequences to identify the selected coded signal sequence with which the user data signal was coded by the data processing means of the transmitter;

subtracting means, coupled to said buffering means and said comparing means, for subtracting each coded data signal of the identified coded data signal sequence from the buffered combined coded voice and coded data signal from which the selected coded signal sequence was identified by said comparing means to recover the coded voice signal;

data signal processing means, coupled to the comparing means, for decoding the identified coded data signal sequence to recover the data signal received for coding by the transmitter; and voice signal processing means, coupled to the subtracting means, for decoding the recovered coded voice signal to obtain the voice signal received for coding at the transmitter.

8. In the system of claim 7, said comparing means of said receiver further comprising means for comparing the buffered coded data signal sequence with each of the plural permissible coded signal sequences to provide a likelihood metric for each said comparison, said likelihood metric defining a degree to which the permissible coded signal sequence of the said each comparison matches the buffered coded data signal sequence for correlating the buffered coded data signal sequence with the permissible coded signal sequence with which the data signal was coded prior to transmission.

9. In a system for simultaneous voice/data transmission over a single communication channel and including a transmitter comprising data processing means for receiving and coding a time-varying user data signal using a selected coded signal sequence of a predetermined coding scheme defined by a plurality of permissible coded signal sequences to produce a coded data signal sequence, voice signal processing means for receiving and coding a time-varying voice signal, means for combining the coded data signal sequence with the coded voice signal, and means for transmitting the combined coded voice and coded data signals over the communication channel to the receiver, a receiver comprising:

means for buffering the combined coded voice and coded data signals received by the receiver from the transmitter over a predetermined period of time to define a buffered data signal sequence;

comparing means coupled to said buffering means for comparing the buffered coded data signal sequence with each of the plural permissible coded signal sequences to identify the selected coded signal sequence with which the user data signal was coded by the data processing means of the transmitter;

subtracting means coupled to said buffering means and said comparing means, for subtracting each coded data signal of the identified coded data signal sequence from the buffered combined coded voice and coded data signal from which the selected coded signal sequence was identified by said comparing means to recover the coded voice signal;

data signal processing means, coupled to the comparing means, for decoding the identified coded data signal sequence to recover the data signal received for coding by the transmitter;

voice signal processing means, coupled to the subtracting means, for decoding the recovered coded voice signal to obtain the voice signal received for coding at the transmitter: and wherein the transmitter further comprises data signal generating means coupled to the data processing means for generating, when no data signal is being received for coding by the transmitter data processing means, a data tracking signal for combination with the coded voice signal to form said combined signal for transmission to the receiver along the communication channel.

10. In the system of claim 9, said generated data tracking signal comprising side data for use by the receiver to maintain timing and equalization of the receiver during intervals in which no data signal is being received by the transmitter for coding and transmission to the receiver.

11. In the system of claim 7, said buffering means further comprising means for storing the coded data signals received during the predetermined period of time.

12. In the system of claim 7, said receiver further comprising detecting means coupled between said buffering means and said comparing means for detecting the selected coded data signal sequence from the buffered combined coded voice and coded data signals prior to comparing with said plural permissible coded data signal sequences in said comparing means.

13. A method of recovering, at a receiver connected to a communications channel, voice and data signals input to a transmitter and transmitted over the communications channel in a simultaneous voice/data transmission, said method comprising the steps of:

receiving the simultaneous voice/data transmission including combined coded voice and coded data signals, in the receiver from the communications channel;

buffering the combined coded voice and coded data signals received in the receiver over a predetermined period of time to define a buffered coded data signal sequence;

comparing the buffered coded data signal sequence with each of a predetermined plurality of permissible coded signal sequences to identify a one of said plural coded signal sequences with which the data signal was coded at the transmitter;

subtracting each coded data signal of the identified coded signal sequence from the buffered combined coded voice and coded data signal from which the one of the plural signal sequences was identified to recover the coded voice signal; and decoding the recovered coded voice signal and the identified coded data signal sequence to recover the voice and data signals input to the transmitter.

14. The method of claim 13, wherein said step of comparing further comprises comparing the buffered coded data signal sequence with each of the predetermined plural permissible coded signal sequences to provide a likelihood metric for each said comparison, said likelihood metric defining a degree to which the permissible coded signal sequence of each comparison matches the buffered coded data signal sequence for correlating the buffered coded data signal sequence with one permissible coded signal sequence with which the data signal was coded prior to transmission.

15. The method of claim 13, further comprising the step of storing the buffered coded data signal sequence prior to said comparing step.

16. The method of claim 13, wherein said data signals are coded in the transmitter using a selected coded signal sequence of a predetermined coding scheme defined by the predetermined plurality of permissible coded signal sequences, said method further comprising the step of detecting the selected coded signal sequence of said data signals from the buffered combined coded voice and coded data signals prior to said step of comparing.

17. A receiver for recovering voice and data signals input to a transmitter and transmitted by the transmitter as a simultaneous voice/data transmission over a single communication channel, said receiver comprising:

means for buffering the simultaneous voice/data transmission including combined coded voice and coded data signals received by the receiver from the communication channel over a predetermined period of time to define a buffered coded data signal sequence;

comparing means, coupled to said buffering means, for comparing the buffered coded data signal sequence with each of a plurality of permissible coded signal sequences to identify a one of the plural coded signal sequences with which the data signal was coded at the transmitter;

subtracting means, coupled to said buffering means and said comparing means, for subtracting each coded data signal of the identified coded signal sequence from the buffered combined coded voice and coded data signal from which the one of the plural coded signal sequences was identified to recover the coded voice signal;

data signal processing means, coupled to the comparing means, for decoding the identified coded signal sequence to recover the data signal input to the transmitter; and voice signal processing means, coupled to the subtracting means, for decoding the recovered coded voice signal to obtain the voice signal input to the transmitter.

18. The receiver of claim 17, wherein said comparing means further comprises means for comparing the buffered coded data signal sequence with each of the plural permissible coded signal sequences to provide a likelihood metric for each said comparison, said likelihood metric defining a degree to which the permissible coded signal sequence of each comparison matches the buffered coded data signal sequence for correlating the buffered coded data signal sequence with the one permissible coded signal sequence with which the data signal was coded prior to transmission.

19. The receiver of claim 17, wherein said buffering means further comprises means for storing the buffered coded data signal sequence.

20. The receiver of claim 17, wherein said data signals are coded in the transmitter using a selected coded signal sequence of a predetermined coding scheme defined by the predetermined plurality of permissible coded signal sequences, said receiver further comprising detecting means, coupled between said buffering means and said comparing means, for detecting the selected coded signal sequence of said data signals from the buffered combined coded voice and coded data signals prior to comparing with said plural permissible coded data signal sequences in said comparing means.

* * * * *

United States Patent And Trademark Office
CERTIFICATE OF CORRECTION

PATENT NO. : 5,796,716
DATED : August 18, 1998
INVENTOR(S): Richard Kent Smith

It is certified that error appears in the above-identified patent and that said Letters Patent is hereby corrected as shown below.

Col. 10, line 25, delete ":" and replace with -- ; --;

Col. 10, line 39, delete ":" and replace with -- ; --;

Col. 10, line 42, after "transmitter" and before "and", add -- ; --;

Col. 11, line 65, delete ":" and replace with -- ; --;

Col. 12, line 13, delete ":" and replace with -- ; --.

Signed and Sealed this

Twenty-third Day of March, 1999

Attest:

Q. TODD DICKINSON

Attesting Officer

Acting Commissioner of Patents and Trademarks